(12) United States Patent
Boss et al.

(10) Patent No.: US 10,248,176 B2
(45) Date of Patent: *Apr. 2, 2019

(54) PEER TO PEER POWER MANAGEMENT

(71) Applicant: INTERNATIONAL BUSINESS MACHINES CORPORATION, Armonk, NY (US)

(72) Inventors: Gregory J. Boss, Saginaw, MI (US); Andrew R. Jones, Round Rock, TX (US); P. Daniel Kangas, Raleigh, NC (US); Kevin C. McConnell, Austin, TX (US); John E. Moore, Jr., Brownsburg, IN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/549,924

(22) Filed: Nov. 21, 2014

(65) Prior Publication Data

US 2015/0082059 A1    Mar. 19, 2015

Related U.S. Application Data

(63) Continuation of application No. 12/795,918, filed on Jun. 8, 2010, now Pat. No. 8,954,762.

(51) Int. Cl.
   *G06F 1/26* (2006.01)
   *H01R 29/00* (2006.01)
   *H04L 12/10* (2006.01)

(52) U.S. Cl.
   CPC ............... *G06F 1/266* (2013.01); *G06F 1/26* (2013.01); *G06F 1/263* (2013.01); *H01R 29/00* (2013.01); *H04L 12/10* (2013.01)

(58) Field of Classification Search
   None
   See application file for complete search history.

(56) References Cited

U.S. PATENT DOCUMENTS

| 5,045,769 A | 9/1991 | Everett, Jr. |
| 5,570,002 A | 10/1996 | Castleman |

(Continued)

FOREIGN PATENT DOCUMENTS

| EP | 1455256 | 9/2004 |
| EP | 1571745 | 9/2007 |

(Continued)

OTHER PUBLICATIONS

European Examination Report for EP Application No. 07 802 864.4 dated Mar. 8, 2016, 7 pages.

(Continued)

*Primary Examiner* — Tanh Q Nguyen
(74) *Attorney, Agent, or Firm* — Brian M. Restauro; Andrew M. Calderon; Roberts Mlotkowki Safran Cole & Calderon, P.C.

(57) ABSTRACT

A system and methods for delivering power to a multitude of portable electronic devices is provided. More specifically, the system and methods provide for powering different portable electronic devices through a central charging device. The method of delivering a power supply to a plurality of portable electronic devices includes determining a power requirement for each of the portable computing devices and supplying the power requirement to each of the portable computing devices in a daisy chain configuration using a central power device.

11 Claims, 5 Drawing Sheets

(56) References Cited

U.S. PATENT DOCUMENTS

| | | | |
|---|---|---|---|
| 5,815,389 A * | 9/1998 | Plow | G06F 1/26 320/134 |
| 6,080,022 A | 6/2000 | Shaberman et al. | |
| 6,100,670 A | 8/2000 | Levesque | |
| 6,134,612 A | 10/2000 | Bailey et al. | |
| 6,160,376 A | 12/2000 | Kumar et al. | |
| 6,331,761 B1 | 12/2001 | Kumar et al. | |
| 6,459,175 B1 | 10/2002 | Potega | |
| 6,633,932 B1 | 10/2003 | Bork et al. | |
| 7,145,312 B2 * | 12/2006 | Lanni | H02J 7/0004 320/114 |
| 7,375,285 B2 | 5/2008 | Chiang | |
| 7,447,762 B2 * | 11/2008 | Curray | H04L 29/06 702/61 |
| 7,545,118 B2 | 6/2009 | Kim | |
| 7,646,107 B2 | 1/2010 | Smith | |
| 7,818,457 B1 | 10/2010 | Flood et al. | |
| 7,930,043 B2 | 4/2011 | Bhogal et al. | |
| 8,102,254 B2 | 1/2012 | Becker et al. | |
| 8,755,914 B2 | 6/2014 | Bhogal et al. | |
| 2002/0111698 A1 | 8/2002 | Graziano et al. | |
| 2002/0166890 A1 | 11/2002 | Hsuan et al. | |
| 2003/0060243 A1 * | 3/2003 | Burrus, IV | H01M 10/441 455/572 |
| 2003/0085621 A1 | 5/2003 | Potega | |
| 2003/0151309 A1 | 8/2003 | Hutton | |
| 2003/0217177 A1 * | 11/2003 | Gulati | H04L 49/252 709/238 |
| 2004/0003304 A1 | 1/2004 | Kobayashi | |
| 2004/0108833 A1 | 6/2004 | Lanni | |
| 2004/0193329 A1 | 9/2004 | Ransom et al. | |
| 2005/0083615 A1 | 4/2005 | Rose | |
| 2005/0153262 A1 * | 7/2005 | Kendir | F41G 3/2655 434/21 |
| 2005/0192713 A1 | 9/2005 | Weik et al. | |
| 2005/0200332 A1 | 9/2005 | Kangas et al. | |
| 2006/0071558 A1 | 4/2006 | Smith | |
| 2007/0073420 A1 * | 3/2007 | Lanni | H02J 1/00 700/22 |
| 2007/0075676 A1 | 4/2007 | Novak | |
| 2007/0081553 A1 * | 4/2007 | Cicchetti | H04L 12/10 370/466 |
| 2007/0110081 A1 * | 5/2007 | Miller | H04L 12/10 370/401 |
| 2007/0206630 A1 | 9/2007 | Bird | |
| 2007/0225833 A1 | 9/2007 | Menas et al. | |
| 2008/0126292 A1 | 5/2008 | Bhogal et al. | |
| 2008/0238701 A1 * | 10/2008 | Bickel | G01D 4/004 340/635 |
| 2008/0315826 A1 | 12/2008 | Alberth, Jr. et al. | |
| 2009/0259867 A1 | 10/2009 | Paniagua, Jr. et al. | |
| 2010/0064155 A1 | 3/2010 | Boss et al. | |
| 2010/0223480 A1 | 9/2010 | Fratti et al. | |
| 2011/0018344 A1 * | 1/2011 | Liao | G06F 1/266 307/31 |
| 2011/0208980 A1 | 8/2011 | Brooks et al. | |
| 2011/0285765 A1 * | 11/2011 | Lamontagne | B41J 3/36 347/3 |
| 2011/0302430 A1 | 12/2011 | Boss et al. | |

FOREIGN PATENT DOCUMENTS

| | | |
|---|---|---|
| JP | 0566864 | 3/1993 |
| JP | 05066864 | 3/1993 |
| JP | 0923574 | 1/1997 |
| JP | 09230964 | 9/1997 |
| JP | 2000010671 | 1/2000 |
| JP | 2000181582 | 6/2000 |
| JP | 2000357029 | 12/2000 |
| JP | 2002281663 | 9/2002 |
| JP | 2003348757 | 12/2003 |
| JP | 2004038292 | 2/2004 |
| JP | 2004135397 | 4/2004 |
| JP | 2004254444 | 9/2004 |
| JP | 2005051922 | 2/2005 |
| JP | 2005128821 | 5/2005 |
| JP | 2005151772 | 6/2005 |
| JP | 2006025532 | 1/2006 |
| JP | 2006146780 | 6/2006 |
| JP | 2006230129 | 8/2006 |
| WO | 0207365 | 1/2002 |
| WO | 02056441 | 7/2002 |
| WO | 2005029243 | 3/2005 |
| WO | 2005088820 | 9/2005 |

OTHER PUBLICATIONS

Office Action from U.S. Appl. No. 14/258,390 dated Jun. 6, 2016. 10 pages.

Office Action dated Nov. 14, 2018 in related U.S. Appl. No. 15/407,482, 7 pages.

\* cited by examiner

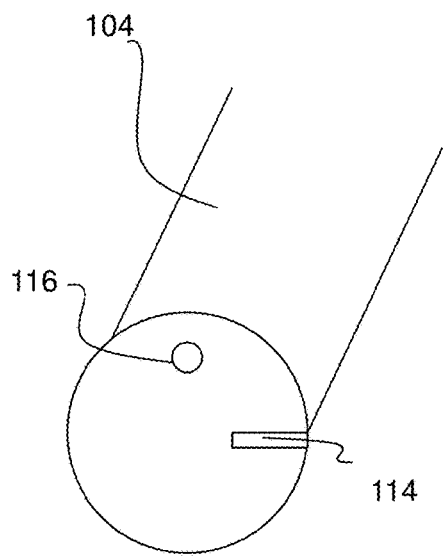 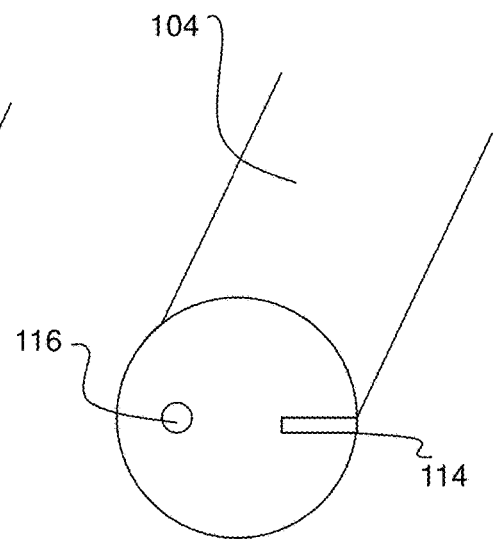
FIG. 4a    FIG. 4b
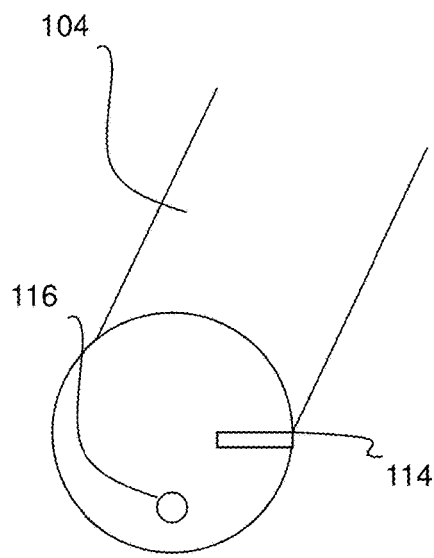 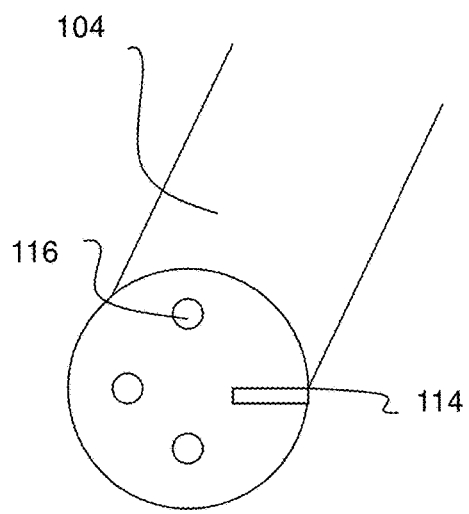
FIG. 4c    FIG. 4d

PEER TO PEER POWER MANAGEMENT

TECHNICAL FIELD

The invention is directed to systems and methods for delivering power to a multitude of portable electronic devices and, more particularly, to systems and methods for powering different portable electronic devices through a central charging device.

BACKGROUND

Mobile computing devices such as laptop computers, portable digital assistants (PDAs), etc. are commonly used in business to increase worker productivity, increase communications capabilities and generally increase overall worker efficiency. These same types of devices are also used by many people for personal use such as to download information from the Internet. Importantly, these mobile computing devices are powered on batteries, which are recharged by A/C adapter power supplies.

Mobile computing devices are known to be manufactured with different power requirements, even though they may be the same type of device. For example, laptop computers of different models may have different power requirements, depending on the manufacturer's specifications. Even with laptops that have the same power requirements, it is not uncommon for different tips (adapters) to be required for devices manufactured by the same or different manufacturers. This all leads to confusion by the consumer/user and, in many instances, leads the consumer to use the internal power source, e.g., battery, of the device.

Thus, it is not uncommon to use the internal power source, e.g., battery, of the device, whether it is for business or personal use. However, batteries in mobile computing devices have limited capacity (time) and have to be recharged periodically or they will power down unexpectedly which, in turn, can lead to loss of information. To recharge the battery, it is necessary for the user to travel with the A/C power adapter and accompanying cables (e.g., the brick). However, there are often times where someone forgets to bring their A/C power adapter, or they do bring it, but it is not working properly. In such a case, the person can only use the device until the battery runs out or, if fortunate, the user can find someone else that has the same A/C power adapter to borrow. In an attempt to save power, some people use the power management settings within their computers in an attempt to lower power consumption of their device in order to extend battery life.

In many settings such as, for example, in conference room environments (where several mobile computing devices will be found), there is limited resources for borrowing an A/C power adapter from someone, assuming that the user can even find someone with the same type of A/C power adapter which is needed for a particular device. For example, in such settings, there is usually a near 1 to 1 ratio of A/C power adapter to mobile computing devices. In these instances, people often share their power adapter with others keeping each computing device running, but never at a full charge. Additionally, there may not be enough A/C outlets for the number of mobile computing devices to plug in and charge, further compounding this problem. Although some people are known to travel with a power strip, this only adds addition weight to their baggage.

SUMMARY

In a first aspect of the invention, a method is provided which delivers a power supply to a plurality of portable computing devices. The method comprises determining a power requirement for each of the portable computing devices and supplying the power requirement to the portable electronic device in a daisy chain configuration using a central power device.

In another aspect of the invention, a system is provided which delivers power to a plurality of portable computing devices. The system comprises a central power device having a power cord for connecting to a power source. The system further comprises a plurality of power cords, each having an adapter which is configured to connect to one of the portable computing devices and the central power device in a daisy chain fashion.

In still another aspect of the invention, a system comprises a database containing data associated with one or more power requirements of a plurality of different types of electronic devices, and at least one of a hardware and software component for determining the power requirements for the any of the different types of electronic devices and providing the information to a central power device for powering the electronic devices in a daisy chain configuration.

In still another aspect of the invention, a computer program product comprises a computer usable storage medium having readable program code embodied in the medium. The computer program product includes at least one component. For example, the computer program product includes at least one component to determine power requirements for any of plurality of types of portable computing devices to be supplied by a central power device in a daisy chain configuration.

In yet another aspect of the invention, a method for deploying a system of delivering a power supply to a plurality of portable computing devices comprises providing a computer infrastructure operable to determine a power requirement for each of the portable computing devices and supply the power requirement to each of the portable computing devices in a daisy chain configuration using a central power device.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIGS. 4a-4d show several power tips used to connect portable computing devices in accordance with aspects of the invention.

DETAILED DESCRIPTION

Figure 1:
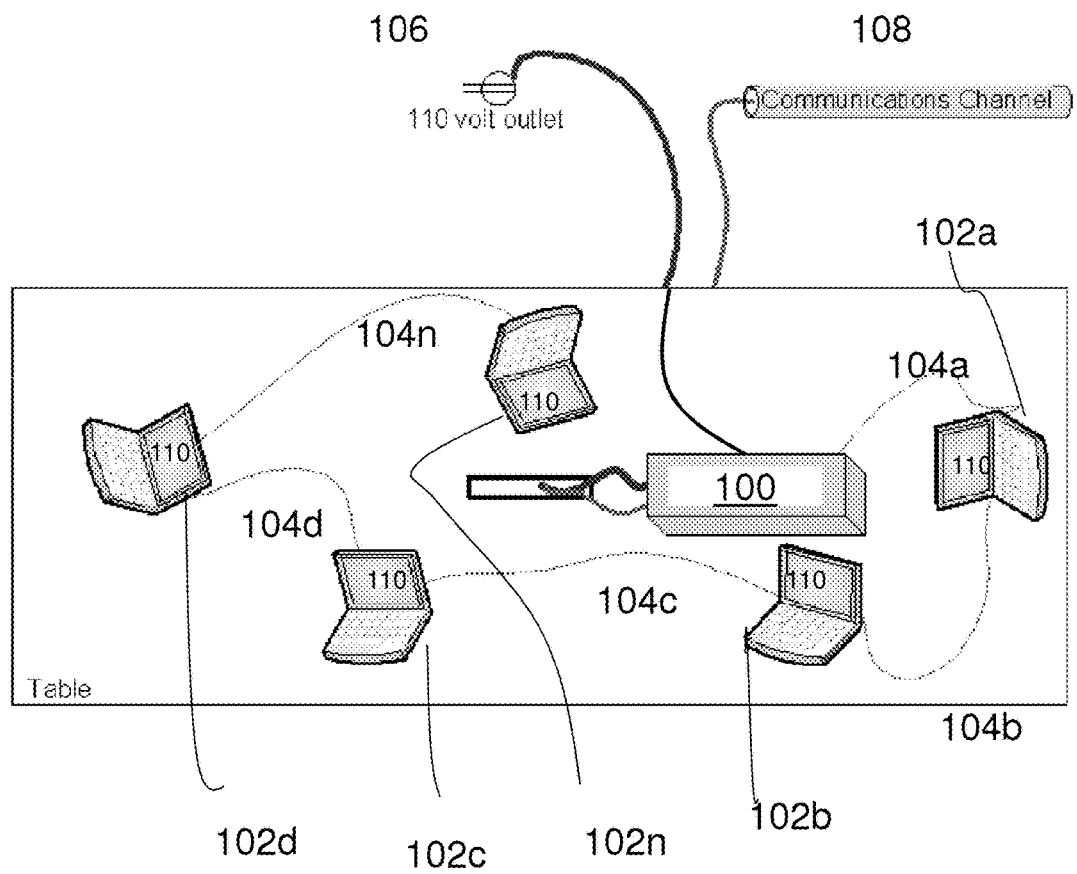
FIG. 1 shows an implementation using a central charging device in accordance with aspects of the invention.

The invention is directed to systems and methods for delivering power to a multitude of portable electronic devices and, more particularly, to systems and methods for powering different portable electronic devices through a central charging device. The present invention can charge multiple battery operated portable electronic devices (e.g. laptops, handhelds, etc.) through a single central charging device and electrical outlet. Several methods dictating the communication, identification and authorization of the portable electronic devices to be charged are contemplated by the invention, as described in more detail below. The methods of the present invention can also be implemented as a set of instructions provided to one or more users of the system of the present invention.

In embodiments, the invention comprises a central charging device that provides power for multiple portable electronic devices through a standard/universal connection/port on the portable electronic devices. The central charging device includes, in embodiments, one A/C plug that plugs into a standard A/C wall outlet. The central charging device also includes, in embodiments, a cable with a standard/universal connection that can be connected to any known portable electronic device. The connected portable electronic device can then be connected to another portable electronic device, and so on, in a daisy chain configuration, all receiving power from the central charging device. The daisy chain connection can continue until the central charging device reaches its maximum capacity.

In embodiments of the present invention can also provide network capability (as an option) if wireless is not present, as well as including logic. The logic can be associated with any of the portable electronic devices or the central charging device, which can be retrofitted or provided directly from the manufacturer, as an option or as standard hardware. The logic can be connected to a communication channel (e.g., network capability), and can be used to determine the proper power requirements for each of the portable electronic devices. In embodiments, portable electronic devices in the daisy chain configuration can receive information concerning the power requirements of downstream portable computing devices through the communication channel in order to send the proper power to the portable computing device from the central charging device. This information can be sent from a computer's BIOS, for example.

In embodiments, the communication channel can be a wireless communication channel for receiving and providing power requirements for each of the computing devices in the shared charging environment. The required power requirements for each portable computing device, in embodiments, can be provided directly from each of the portable computing devices to the central charging device, or from portable computing device to portable computing device, and directly to the central charging device. In further embodiments, all or some of the logic (e.g., determination of power requirements) can be handled by each of the portable computing devices. The portable computing devices can also be equipped with circuitry and a receptor power port to provide the proper power requirements for each computing device in the chain. In embodiments, each of the computing devices can connect directly to the central charging device, as discussed in more detail below.

FIG. 1 shows a daisy chain configuration in accordance with aspects of the invention. For example, FIG. 1 shows a central charging device (A/C adapter) 100 connected to several portable computing device 102a-102n, via respective cables 104a-104n. Although five portable computing devices are shown, it should be understood that this invention is not limited to any number of portable computing devices connected to the central charging device 100. For the purpose of this description, the portable computing devices are laptops, but any type of battery driven devices could be used with the present invention. In embodiments, the central charging device 100 is connected to a single power outlet 106.

In embodiments, the portable computing devices 102a-102n are connected to the central charging device 100 in a daisy chain configuration. For example, as shown in this embodiment, the first portable computing device 102a plugs into the central charging device 100 using the appropriate cable 104a. In turn, subsequent portable computing device 102b-102n are connected to an upstream portable computing device in a daisy chain fashion. In alternative or additional embodiments, the central charging device 100 can include a multitude of power connections one for each of the portable computing device, or used in combination with the daisy chain configuration.

In embodiments, the central charging device 100 can support many different configurations. For example, the central charging device 100 can support:

(i) a single output cable that supports portable computing devices 102a-102n with a specific range of voltage requirements (e.g. 12-14 volts);

(ii) multiple output cables that each supports portable computing devices 102a-102n with a specific range of voltage requirements (e.g., one for 12-14 volts, one for 16-18 volts, etc.); and/or (iii) a single output cable with a large range of voltage capabilities (e.g. 9-24 volts) that supports portable computing devices 102a-102n with internal voltage regulators 110 that accept a specified voltage and passes the excess through its output port to down stream portable computing devices.

The central charging device 100 may include built in criteria (logic) used to determine the power distribution to attached portable computing devices, or may include a programmable system that can accept or define the power requirements of each connected device and then apply a power distribution criteria, via a communication channel 108. It is through this communication channel 108 that the central charging device 100 can program itself or one or more of the portable computing devices 102a, . . . 102n with the information regarding the amount of charge it is to receive and possibly other information (e.g., how long it will receive the charge, what charge to pass thru to down stream devices, discovering a type of portable computing device based on an identification provided by the portable computing device, etc.).

In embodiments, the portable computing devices 102a-102n can also include a communication channel 108. The communication channel 108 for both the portable computing devices and the central charging device 100 can be, for example, a wired ethernet, wireless LAN, etc. Alternatively or in combination, the connector (cable 104a-104n) can provide both the power (e.g., electrical current for charging the portable computing device) and the communication channel for communicating both to the central charging device 100 as well as upstream and/or downstream devices in the charging network. Information received from the portable computing devices can be, for example, identification information to determine power requirements or the power requirements, themselves. In embodiments, the information can be sent serially from one portable computing device to another, and then to the central charging device 100, or directly to the central charging device 100 or any combination thereof, in the case that one or more of the portable computing devices in the daisy chain configuration does not have the ability to provide or transmit such information. In addition, the central charging device 100 can send out a query to each of the portable computing devices in order to determine the power requirements.

Figure 2:
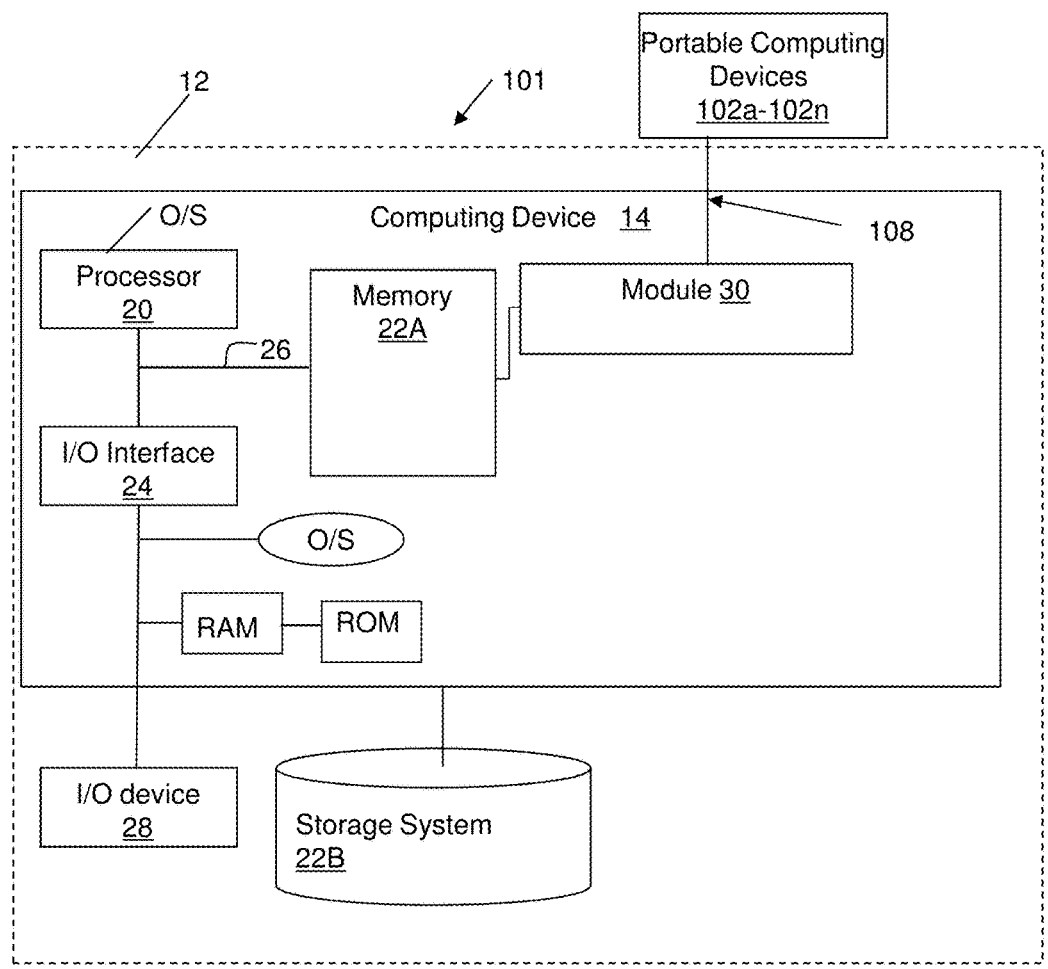
FIG. 2 shows an illustrative environment for implementing the systems and methods in accordance with aspects of the invention.

FIG. 2 shows an illustrative module that can implement the processes of the invention. For example, the central charging device 100 (and/or any combination of the portable computing devices 102*a*-102*n*) includes a control module 101, which is represented by a management system shown in FIG. 1, for managing the processes in accordance with the invention. To this extent, the control module 101 comprises a management system (e.g., control module) 30, which is operable to identify, discover and delivery power requirements to each of the portable computing devices 102*a*-102*n*, e.g., process described herein. The control module 101 is shown connected to a database 22B, which may be internal or external, or it can be connected to any of the portable computing devices 102*a*-102*n* by the communications channel 108. The database 22B may include a look up table power requirements for various types of portable computing devices, to name a few benefits.

In embodiments, the control module 30 is configured and/or operable to determine a power requirement of a portable computing device connected to the central charging device 100. This can be accomplished through several mechanisms as discussed herein. For example, the connected portable computing device can transmit the power requirements directly to the central charging device 100 by the communication channel 108 (wireless, LAN, through the power connection, etc.). Alternatively or in combination with other embodiments, the connected portable computing device can provide this information to another portable computing device, which would act as an intermediary with the central charging device. In further embodiments, the portable computer device can provide system requirements and/or identification information from its BIOS, for example, to the control module 30 which, in turn, can look up the appropriate power requirements that are stored in the database (storage 22B) (e.g., within a look-up table). In still another alternative embodiment or in combination with the other embodiments, the control module 30 can determine a maximum power requirement and allow the internal voltage regulator of a connected portable computing device (e.g., a previously connected portable computing device in the daisy chain) in the daisy chain to adjust the power requirement appropriately. In still another embodiment, the control module 30 can determine the maximum amount of power it can supply to the connected portable computing device and, in embodiments, inform any of the portable computing devices in the chain that it can or cannot supply enough power for the portable computing devices.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any users of a portable computing device. In return, the service provider can receive payment from the customer(s) under a subscription and/or fee agreement and/or the service provider can receive payment from the sale of advertising content to one or more third parties.

The control module 101 can be implemented on a computing device 14 which includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S). The computing device 14 is in communication with the external I/O device/resource 28 and the storage system 22B.

In general, the processor 20 executes computer program code, which can be stored in the memory 22A and/or storage system 22B. The control module 30 can be implemented as one or more program code stored in memory 22A as separate or combined modules. Additionally, the control module 30 may be implemented as separate dedicated processors to provide the function of this tool. While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:
- an electrical connection having one or more wires,
- a portable computer diskette,
- a hard disk,
- a random access memory (RAM),
- a read-only memory (ROM),
- an erasable programmable read-only memory (EPROM or Flash memory),
- an optical fiber,
- a portable compact disc read-only memory (CDROM),
- an optical storage device,
- a transmission media such as those supporting the Internet or an intranet, and/or
- a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any storage medium that can contain, store, communicate, propagate, or transport the program for use by or in connection with the instruction execution system, apparatus, or device. The computer-usable storage medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

Figure 3:
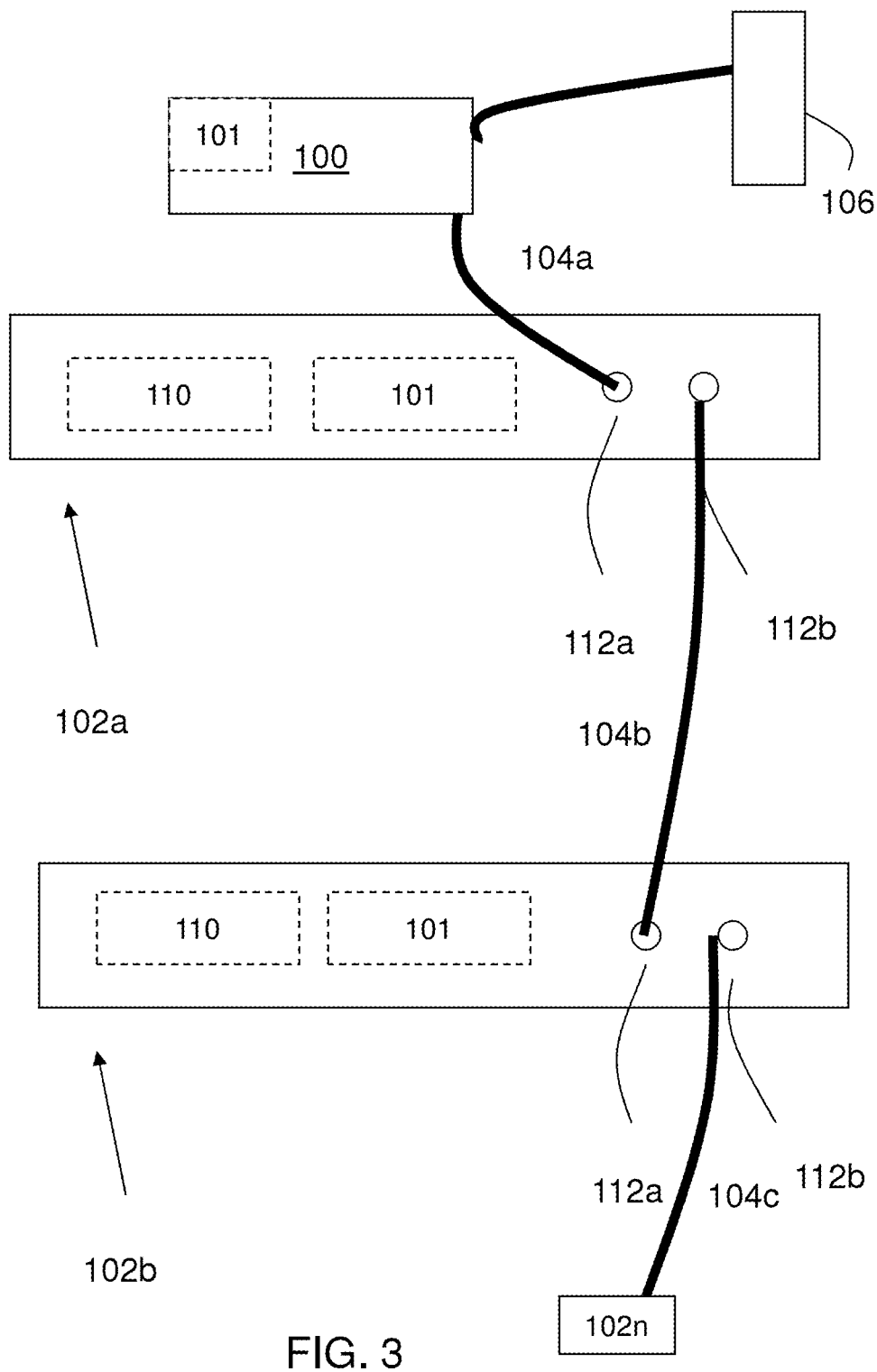
FIG. 3 shows an exemplary power connection for a portable computing device, implementing aspects of the invention.

FIG. 3 shows an exemplary power connection for a portable computing device, implementing aspects of the invention. In specific, each of the portable computing devices 102a, 102b. . . 102n includes a power connection port 112a and a daisy chain receptor port 112b. The power connection port 112a, as in conventional computing systems, receives power; however, in the present invention, the power connection 112a can receive power from either the central charging device 100 or another portable computing device 102b, . . . 102n. In embodiments, each portable computing device 102a, 102b, . . . 102n can also provide power requirements to a subsequent computing device 102b in the chain using, for example, internal voltage regulators 110 that accept a specified voltage and passes the excess through its receptor port 112b to down stream portable computing devices. In embodiments, the internal voltage regulators 110 would only draw the power it was allowed to draw based upon its own internal power requirements. More specifically, the internal voltage regulator would regulate the voltage to its own computing device or, in embodiments, to another portable computing device in the daisy chain configuration.

Portable computing devices can provide power to subsequent portable computing devices 102b, . . . 102n by use of the daisy chain receptor port 112b connecting to a power connection 112a of a subsequent device in the daisy chain. For example, in embodiments, the output of power to the next portable computing device 102b, . . . 102n can be provided along a single cable in serial fashion by connecting the cable between the chain receptor port 112b and the power connection port 112a. The adapters may be modified to provide the appropriate connections required to implement the functions described herein as discussed in further detail below.

FIGS. 4a-4d show several power tips used to connect portable computing devices in accordance with aspects of the invention. In embodiments, the connector 104, e.g., DC plug, of the present invention can include, for example, an interference selector key 114 and one more connections 116. The connector 104, e.g., DC plug, of the present invention can also include an integrated communication link.

As shown in, for example, FIGS. 4a-4d, each connector 104 can only be used for a single voltage requirement of the portable computing device, by aligning interference selector key 114 and one more connections 116 with the corresponding features on the portable computing device. For example, by matching the corresponding mating key 114 in the DC receptacle it is possible to route the correct voltage to the portable computing device using the aligned connection 116. That is, at the particular rotation the correct voltage conductor 116 will mate with the example DC connection of the portable computing device, as described with reference to FIG. 3.

For example, in one embodiment, the connection 116 is at a 90° (on a top side) with respect to the interference selector key 114 (FIG. 4a). By way of non-limiting example, this orientation can be used for devices that need 15V. In another embodiment, the connection 116 is at a 180° (in horizontal) alignment with respect to the interference selector key 114 (FIG. 4b). By way of non-limiting example, this orientation can be used for devices that need 16V. In another embodiment, the connection 116 is at a 90° (on a bottom side) with respect to the interference selector key 114 (FIG. 4c). By way of non-limiting example, this orientation can be used for devices that need "X" V. In another embodiment, as shown in FIG. 4d, one or more connections 116 can be provided on a single tip in order to accommodate many different devices that have different power requirements.

Figure 5:
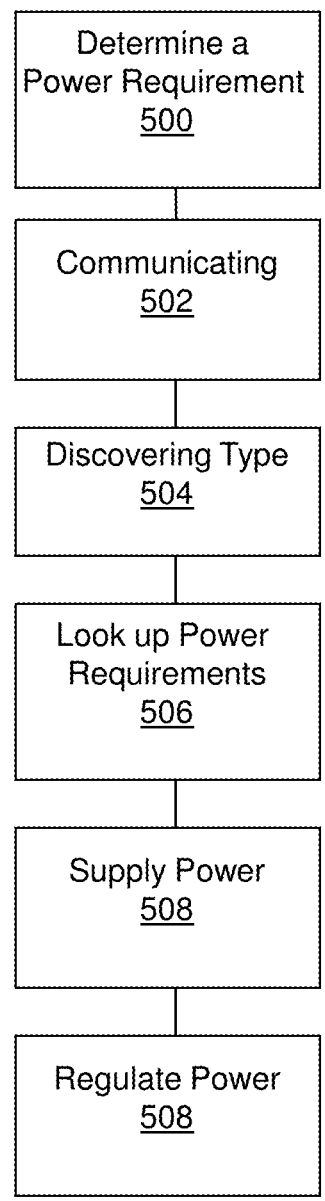
FIG. 5 shows a method in accordance with aspects of the invention.

FIG. 5 shows a method in accordance with aspects of the invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In particular, FIG. 5 shows a method of delivering power to a plurality of portable computing devices. At step 500, the method (e.g., program control or service provider) determines a power requirement for each of the portable computing devices. In embodiments, the determining is performed by accessing an internal or external database to determine power requirements for each of the portable computing devices. In further embodiments, the determining is provided by communicating the power requirement through a communication link at step 502. The power requirements may be based on discovering a type of portable computing device based on an identification received from the portable computing devices through a communication link and using the identification to determine the power requirement, at step 504. At step 506, the method looks up power requirements for each of the portable computing devices in response to a communication. At step 508, the method supplies the power requirement to each of the portable computing devices in a daisy chain configuration using a central power device. In step 508, each of the portable computing devices can be linked in the daisy chain configuration to provide power to a subsequent portable computing device in the daisy chain configuration. At step 510, the method regulates power requirements received from the central power device through a voltage regulator.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A system of delivering power to a plurality of portable computing devices, comprising:
    a central power device in the form of an alternating current adapter including:
        a power cord adapted to directly connect the central power device to a power outlet;
        a control module configured to:
            determine a power requirement of a first portable computing device;
            determine a power requirement of a second portable computing device through a daisy chain configuration;
            send information specifying a total amount of power that the first portable computing device is to receive from the central power device, wherein the total amount of power includes power to be delivered to the first portable computing device and the second portable computing device; and
            control a supply of the total amount of power from the central power device to the first portable computing device, based on a power requirement of the first portable computing device and a power requirement of the second portable computing device; and
    a plurality of power cords comprising:
        a first connecting cable adapted to directly connect a chain receptor port of the first portable computing device to a power receptacle of the second portable computing device, wherein the first connecting cable includes a power tip comprising an interference selector key adapted to mate with a corresponding mating key of the power receptacle of the second portable computing device, and a plurality of voltage conductors forming a plurality of orientations with respect to the interference selector key, wherein each of the plurality of voltage conductors is adapted to route a corresponding and different voltage there through, and wherein the corresponding mating key of the power receptacle of the second portable computing device mating with the interference selector key of the first connecting cable and a voltage conductor of the power receptacle of the second portable computing device mating with a corresponding voltage conductor of the first connecting cable such that the power tip provides a voltage required by the second portable computing device in a first orientation while another orientation allows the power tip to provide a portable computing device having a different voltage requirement from that of the second portable computing device, such that the first connecting cable is configured to support a range of portable computing device voltage requirements corresponding to the plurality of orientations; and
        a second connecting cable adapted to directly connect the central power device to a power receptacle of the first portable computing device, such that the central power device is configured to be connected to the first portable computing device and the downstream second portable computing device in the daisy chain configuration via the first connecting cable and the second connecting cable;
    wherein the system is configured such that the total amount of power is transferred from the central power device to the first portable computing device, and a first portion of the total amount of power corresponding to the power requirement of the first portable computing device is used by the first portable computing device, and a remaining portion of the total amount of power corresponding to the power requirement of the second portable computing device is transferred from the first portable computing device to the second portable computing device through the first connecting cable.

2. The system of claim 1, wherein the control module is further configured to access an internal or external database to determine the power requirements of the first portable computing device and the second portable computing device.

3. The system of claim 1, further comprising a communication link integrated into each of the plurality of power cords such that the control module is configured to determine the power requirement of the first portable computing device based on identification information of the first portable computing device received via the communication link integrated into the second connecting cable.

4. The system of claim 1, wherein the second connecting cable includes a power tip structured for a range of portable computing device voltage requirements.

5. The system of claim 1, wherein the central power device is further configured to send out a query to each of the first portable computing device and the second portable computing device in the daisy chain configuration in order to determine the power requirements of the first portable computing device and the second portable computing device.

6. The system of claim 1, wherein the control module is further configured to receive, from the first portable computing device and the second portable computing device, identification information regarding a type of portable computing device, wherein the determining the power requirements of the first portable computing device and the second portable computing device comprises matching respective voltages corresponding to respective types of portable computing device from a look-up table.

7. The system of claim 1, further comprising:
the first portable computing device; and
the second portable computing device.

8. The system of claim 7, wherein the first portable computing device further includes an internal voltage regulator that accepts a specified voltage and passes power through the chain receptor port of the first portable computing device to the second portable computing device.

9. The system of claim 7, wherein the control module is further configured to receive power requirement information for the first portable computing device and the second portable computing device through the second connecting cable, wherein the first portable computing device acts as an intermediary between the second portable computing device and the control module.

10. The system of claim 7, further comprising:
a database containing data associated with one or more power requirements of a plurality of different types of electronic devices; and
at least one of a hardware and software component configure to determine the power requirements for the first portable computing device and the second portable computing device and provide the power requirements to the central power device.

11. The system of claim 1, wherein the second connecting cable includes a power tip comprising an interference selector key adapted to mate with a corresponding mating key of the power receptacle of the first portable computing device, and a plurality of voltage conductors forming a corresponding plurality of orientations with respect to the interference selector key of the second connecting cable, wherein each of the plurality of voltage conductors of the second connecting cable is adapted to route a corresponding and different voltage there through, and wherein the corresponding mating key of the power receptacle of the first portable computing device mating with the interference selector key of the second connecting cable and a voltage conductor of the power receptacle of the first portable computing device mating with a corresponding voltage conductor of the second connecting cable such that the power tip of the second connecting cable provides a voltage required by the first portable computing device in a first orientation of the second connecting cable while another orientation of the second connecting cable allows the power tip of the second connecting cable to provide a portable computing device having a different voltage requirement from that of the first portable computing device, such that the second connecting cable is configured to support a range of portable computing device voltage requirements corresponding to the plurality of orientations of the second connecting cable.

* * * * *